May 8, 1945.   T. H. SPELLER   2,375,707
DIMPLING MACHINE
Filed Oct. 3, 1942   2 Sheets-Sheet 2
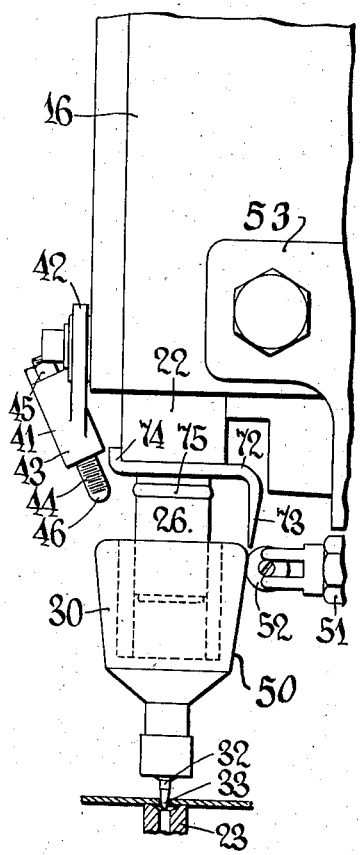
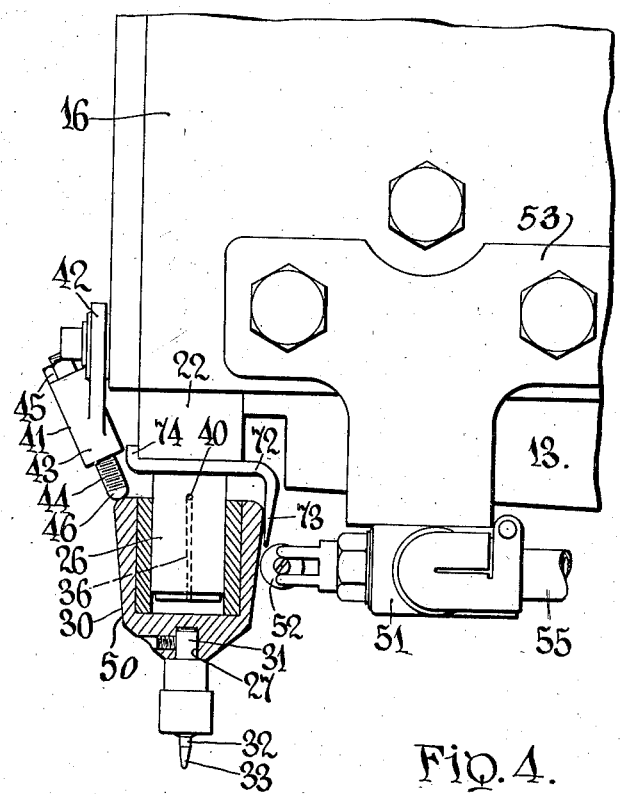
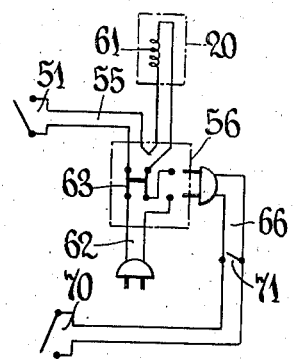
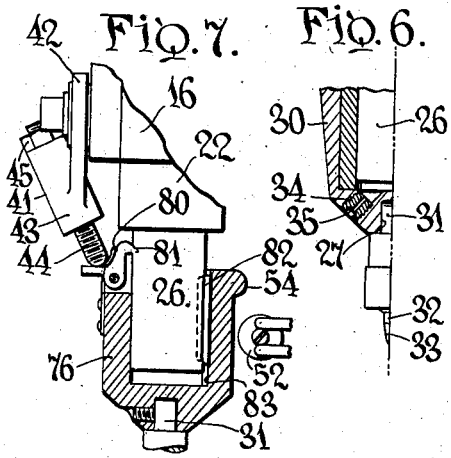
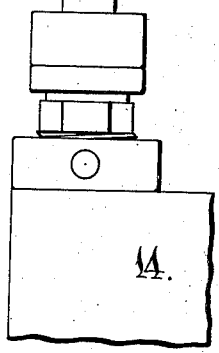
INVENTOR
Thomas H. Speller,
BY
Beau, Brooks, Buckley & Beau.
ATTORNEYS Patented May 8, 1945

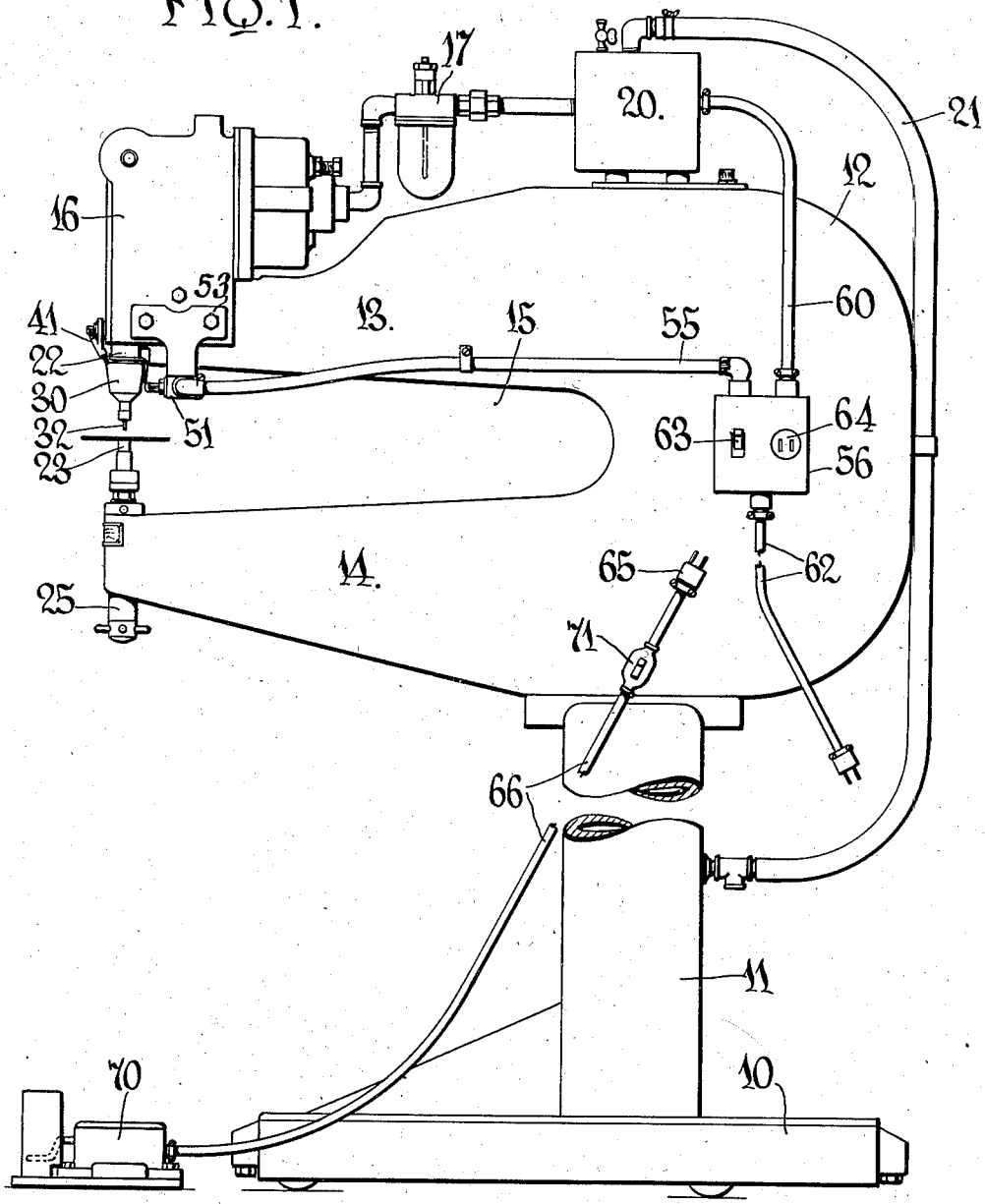

2,375,707

UNITED STATES PATENT OFFICE 2,375,707

DIMPLING MACHINE

Thomas H. Speller, Williamsville, N. Y.

Application October 3, 1942, Serial No. 460,697

27 Claims. (Cl. 153—21)

It is well known to those skilled in the art that where workpieces are to be acted upon by a tool which must be accurately located at a definite position on the workpiece, it is difficult to quickly and accurately bring about such registration. Where the workpiece acted upon is to be countersunk, and when such workpiece is too thin to be countersunk by reaming, a dimpling process is employed. Under present day practice such sheets are first perforated and then brought into registration with an upstanding, stationary pilot carried by the lower dimpling die of the machine, whereupon the upper dimpling die is then brought down to complete the dimpling action. Such practice, however, is slow, particularly when a great number of holes are to be countersunk, due to the fact that the workpiece obscures the lower die and the pilot and, consequently, considerable movement of the workpiece is required to find the selected hole. Moreover, the workpiece must be lifted off the pilot each time a new hole is to be acted upon.

The principal object of my invention has been to overcome the disadvantages above pointed out and to place the pilot on the upper movable die where it will be visible to the operator and where it can, therefore, be quickly and accurately brought into registration with the selected hole.

Another object has been to provide the upper die of the dimpling machine with extensible means movable independently of the operating means of the machine to permit initial registration of the pilot with the workpiece before the operating means is actuated.

Another object has been to provide operating means for the ram which shall cooperate with the extensible means, whereby the ram will be actuated on its power stroke only after the movable die has been accurately registered with the hole.

Moreover, my device is so designed that when the ram of the machine is retracted, the extensible member will be momentarily lifted from the workpiece, whereby the latter may be shifted and another hole registered with the movable die prior to another power stroke of the ram.

Furthermore, my invention contemplates the use of a pilot carried by the movable die and so proportioned in respect to the operating means that the workman may have ample opportunity to register the selected hole with the movable die before the ram is operated.

Moreover, my invention is provided with means for retaining the ram operating means in active position until the ram has returned substantially to its retracted position.

Furthermore, it has been an object to provide a sleeve slidably carried by the ram of the machine and so mounted as to permit movement thereof independently of the ram.

Another object has been to provide a sleeve which shall be momentarily retracted by means of vacuum created between it and the ram on the return stroke.

Furthermore, my device is provided with stripping means for releasing the sleeve at the upper end of the return stroke of the ram.

The above objects and advantages have been accomplished by the device shown in the accompanying drawings, of which:

Fig. 1 is a side elevational view of a dimpling machine provided with my invention.

Fig. 2 is an enlarged fragmentary view, partly in section, showing my invention.

Fig. 3 is an enlarged fragmentary sectional view of a workpiece showing a selected hole which has been dimpled.

Fig. 4 is a diagrammatic view showing the electric circuit of a dimpling tool employing my invention.

Fig. 5 is an enlarged sectional view showing the modified form of invention.

Figs. 6 and 7 show other modifications of my invention.

My invention may be used on any commercial form of dimpling or riveting machine, one form being shown in the accompanying drawings for illustrative purposes. The machine shown in Fig. 1 is provided with the usual base 10 having an upstanding pedestal 11 which carries the frame 12 of the machine. This frame is provided with the usual upper and lower arms 13 and 14, respectively, between which is formed the throat 15 of the machine. Carried by the upper arm 13 is the power unit 16 of the machine, which is preferably of the pneumatic type actuated by air under pressure. This is a standard article of manufacture and is of the type shown and described in U. S. Patent No. 2,313,843 issued March 16, 1943, to E. H. Shaff. The piston of the power unit may be connected to the ram 22 of my device as shown in this patent. The supply of air to the power unit is controlled by means of a solenoid operated valve 20, which is controlled in a manner hereinafter set forth, and which is supplied with air under pressure through conduit 21. An airline oiler 17 is preferably placed in the airline between the solenoid 20 and the power unit 16, whereby the moving parts of the power unit will receive proper lubrication. Since the power unit, as well as the solenoid valve and oiler are standard articles of manufacture, they will not be further described in detail.

The reciprocating ram 22 of the power unit 16 is located opposite the stationary die 23 of my invention. The stationary die is carried by the lower arm 14 through the medium of a floating adapter 24 which is carried by an adjustable ram 25. This adapter is for the purpose of bringing about initial axial alignment of the dies and is of the type well known in the art.

The ram 22 is provided with a cylindrical downward extension 26, and a sleeve 30 having a substantially closed end wall is slidable thereon. The sleeve is provided in its lower end with an aperture 27 within which is mounted the reduced portion 31 of the movable die or punch 32. The punch 32 is provided with an axially arranged pilot 33 which will contact with and rest upon the surface of the workpiece in the absence of registration of the punch with a selected hole. When so registered the pilot and punch will be free to enter the selected hole. The sleeve will be prevented from becoming disengaged with the ram extension 26 by the engagement of the pilot 33 with the workpiece or the punch 32 with the die 23.

The engaging surfaces of the ram extension 26 and of the cup-shaped sleeve 30 are so fitted that a vacuum will be created between them within the sleeve upon axial separating movement thereof, whereby, after being fully engaged with the extension, the sleeve will be elevated during the upward movement of the ram by such vacuum and will be permitted to descend slowly due to gravity after the ram has come to rest at a speed depending upon the fit between these parts. So as to regulate the rate of descent, the sleeve may be provided with a regulated opening 34 of the form of invention of Fig. 6, which opening is formed preferably in a replaceable plug 35 so that the size of the opening may be changed at will by the replacement of the plug with one having a differently sized opening. In the preferable form of my invention, however, as shown in Fig. 2, I provide the extension 26 of the ram with a longitudinal passageway 36 extending from the lower end of the ram to and communicating with a lateral passageway 40 which extends to the periphery of this part of the ram. The parts are preferably so designed that when the ram is in full engagement with the sleeve, the lateral passageway 40 will be covered thereby, and thus the sleeve will be elevated by the ram due to the vacuum formed between it and the lower end of the ram. As the ram reaches the upper end of its retracted stroke, the sleeve is initially moved with respect to the ram which movement serves to uncover the lateral passageway 40 and thereby allow air to slowly enter the sleeve to relieve the vacuum and allow the sleeve to descend by gravity independently of the ram. In order to produce this initial relative movement between a sleeve and the ram, I provide a stripper 41 which has an arm 42 for securement to the power unit of the machine, and which also has a sleeve 43 which carries a screw 44. The screw 44 is adjustably mounted within the sleeve 43 and a lock nut 45 is provided for setting it in its adjusted position. The lower end 46 of the screw is so adjusted as to interrupt the upward movement of the sleeve before the ram reaches the upper limit of its travel, thereby causing relative movement between the sleeve and the ram, thus uncovering the lateral passageway 40.

My invention contemplates the use of means for automatically causing the ram to descend on its power stroke after the pilot has been brought into registration and has entered the selected hole of the workpiece. To this end the extensible member or sleeve 30 of my invention is preferably provided with a tapered exterior periphery 50 extending upwardly from the lower end thereof so that the larger diameter is at the top of the sleeve. An electric switch 51, preferably of the precision type, having an actuating roller 52 is arranged alongside the sleeve and is carried by means of an adjustable bracket 53. Adjustment of the switch is such that when the pilot has entered the selected hole, the sleeve will have actuated the switch roller 52 to close the switch and thereby cause the operation of the ram on its power stroke. Instead of the taper shown in Figs. 1, 5 and 6, it is obvious that the sleeve may have a cylindrical exterior and be provided with an extension 54 for engagement with the roller 52, as illustrated in Fig. 7.

The switch 51 is connected to a switch box 56 carried on the side of the machine by means of suitable conductors inclosed with a conduit 55, suitable conductors being inclosed within a conduit 60 for conducting current from the switch box to the coil 61 (Fig. 4) of the solenoid valve 30. The switch box receives its power from the supply line over suitable conductors inclosed within a conduit 62 and controlled by means of a switch 63. A plug receptacle 64 is provided on the switch box 56 for the reception of the plug 65 provided at the ends of suitable control conductors inclosed within a conduit 66. The conductors of this conduit are connected to the usual foot switch 70 and have connected therein a snap switch 71 which may be closed when it is desired to operate the machine continuously.

Reference is to be had to Fig. 4 where I show the electric circuits diagrammatically. As here shown the switch 63 is closed and current is being conducted to the switch box 56. When the foot switch 70 or the switch 71 is now closed current will flow to one side of the solenoid 61 and to one side of the switch 51. Under these conditions when the sleeve 30 has descended and the pilot is in registration with a selected hole, switch 51 will be closed and current will then flow through the coil 61 of the solenoid valve 20, thereby operating the solenoid valve 20 shown diagrammatically in Fig. 4 and allowing air to flow to the power unit 16 of the machine and causing the ram to move downwardly. Such downward movement will cause the extension 26 of the ram to move downwardly within the sleeve 30 until it reaches the bottom of the bore thereof and the lateral port 40 has been covered. Further movement of the ram will cause the sleeve with its movable die to be forced downwardly under pressure to dimple the workpiece. When the ram is now returned to its retracted position, as hereinbefore described, the sleeve will be moved with the ram owing to the vacuum created within the sleeve by the initial tendency toward separating movement of the parts. In the form of invention shown in Figs. 1 and 2, the stripper screw 44, at a predetermined point in the upward travel of the ram, will contact the sleeve and cause initial movement between it and the ram whereby the lateral port 40 will be uncovered and air will be allowed to enter between the ram and sleeve to vent the vacuum, thus allowing the sleeve to descend by gravity for registration of the pilot with another selected hole.

The power units 16 supplied on some dimpling and riveting tools cause the ram to descend and to be immediately returned when the operating circuit is closed through the control switch 51, even though the switch is opened during the return movement. However, on other types of machines, the power units are so designed that the solenoid valve will be deenergized and cut off the incoming air if the circuit is interrupted through the opening of this switch. In order to accommodate my invention to this latter type of machine, I provide contact maintaining means in the form of a knife 72 which is carried by the ram 22 of the machine. This knife is preferably provided with a downwardly extended blade 73 which engages the roller 52 of the switch 51 on the downward stroke of the ram and holds it closed during substantially the full return stroke thereof and while the sleeve is being carried upwardly by the ram. This knife is prevented from rotating upon the ram preferably by having an upturned end 74 which engages the flat side of the ram.

While I have shown and described the use of vaccum in Figs. 2 and 6 to bring about the elevation of the sleeve and movable die when the ram is retracted, it is obvious that other means may be employed for momentarily coupling the sleeve 30 and ram extension 26. One of such modified means is shown in Fig. 5 where the ram extension 26 is provided with a ring 75 so located as to engage the sleeve when the ram extension 26 has substantially reached the bottom of the bore of the sleeve. This ring may be made of any suitable material which will produce friction between the ram extension and the sleeve when engaged with the bore of the sleeve. It may be of rubber or suitable fabric, or of metal and of an expansible nature so that, when engaged with the bore, the friction will be sufficient to cause the sleeve to be elevated. The sleeve will be disengaged or stripped from this friction producing means by the stripper screw 44 when the ram has reached its uppermost position, as hereinbefore described in connection with the form of Fig. 2.

In the form of Fig. 7, the sleeve 76 is provided with spring-pressed latch means 80 which engage a notch 81 formed in the ram extension 26, which latch is disengaged from the notch by means of the stripper screw 44 when the extension has reached the end of its uppermost travel. In this form of invention it is preferable to provide a key 82 which is carried by the extension 26 and engages a keyway 83 formed in the sleeve, whereby the sleeve is prevented from relative rotation with respect to the extension.

Having described my invention what I claim is:

1. Means for registering the punch and die of a dimpling machine with the selected hole of a workpiece, comprising punch-supporting means adapted for being actuated by the ram of the machine, means for mounting said supporting means whereby it is movable toward the workpiece in the path of and independently of the ram for permitting the registration of the punch with the hole of the workpiece before the ram is operated to actuate the punch, and means carried by the punch-supporting means and the ram for causing return movement of the latter to temporarily move the former away from the workpiece.

2. Means for registering the punch and die of a dimpling machine with the selected hole of a workpiece, comprising punch-supporting means adapted for being actuated by the ram of the machine, means for mounting said supporting means for independent movement relative to the ram toward the workpiece for permitting the registration of the punch with the hole of the workpiece before the ram is operated, temporary coupling means connecting said supporting means and the ram for momentarily raising the former away from the workpiece when the latter is operated on its return stroke, and means for rendering said coupling means inoperative as the ram approaches the end of its return stroke.

3. Means for registering the punch and die of a dimpling machine with a selected hole formed in a workpiece, comprising a sleeve adapted to be operated by the ram of the machine and carrying the punch thereof, said sleeve being movable independently of the ram, vacuum means for temporarily raising said sleeve to retract the punch, and means for venting the vacuum to allow the punch to descend independent of the ram movement and be registered with another hole of the workpiece.

4. Means for registering the punch and die of a dimpling machine with the selected hole of a workpiece, comprising punch-supporting means adapted for being actuated by the ram of the machine, means for mounting said supporting means for independent movement relative to the ram toward the workpiece for permitting the registration of the punch with the hole of the workpiece before the ram is operated, and ram operating means associated with said supporting means and controlled thereby when the last mentioned means has moved toward the workpiece a predetermined distance.

5. Means for registering the punch and die of a dimpling machine with the selected hole of an interposed workpiece, comprising punch-supporting means adapted for being actuated by the ram of the machine, means for mounting said supporting means whereby it is movable toward the workpiece independently of the ram for permitting the registration of the punch with the hole of the workpiece before the ram is operated, ram operating means associated with said supporting means and controlled thereby when the last mentioned means has moved a predetermined distance toward the workpiece to actuate the ram operating means, and a pilot portion extending downwardly from the punch to contact the workpiece in the absence of registration of said punch with the hole to hold the supporting means against such predetermined movement toward the workpiece, thereby preventing the actuation of the ram operating means.

6. Means for registering the punch and die of a dimpling machine with the selected hole of an interposed workpiece, comprising punch-supporting means adapted for being actuated by the ram of the machine, means for mounting said supporting means whereby it is movable toward the workpiece independently of the ram for permitting the registration of the punch with the hole of the workpiece before the ram is operated, ram operating means associated with said supporting means and controlled thereby when the last mentioned means has moved a predetermined distance toward the workpiece to actuate the ram operating means, and a pilot portion carried by said punch for initial entrance into a selected hole of the workpiece in advance of the punch to enable the supporting means moving such predetermined distance to thereby effect the actuation of the ram operating means.

7. Means for registering the punch and die of a dimpling machine with the selected hole of a workpiece, comprising punch-supporting means carried by the ram of the machine and movable independently thereof, means for operating the ram, and means connecting said ram operating means with said supporting means and operable by movement of the latter for actuating said operating means only after said supporting means has moved toward the workpiece a predetermined distance.

8. Means for registering the punch and die of a dimpling machine with selected holes formed in a workpiece, comprising punch-supporting means carried by the ram of the machine and movable independently thereof, means for operating the ram, means connecting said ram operating means with said supporting means and operable by movement of the latter for actuating said operating means, and pilot means associated with said punch for contact with the workpiece in the absence of registration of the workpiece with the pilot to hold the supporting means against further movement toward the workpiece thereby preventing the actuation of said operating means.

9. Means for registering the punch and die of a dimpling machine with the selected hole of a workpiece, comprising a sleeve slidably mounted upon the ram of the machine for independent movement therewith and carrying the punch thereof, means associated with the ram to temporarily move the sleeve with the ram on its return stroke, and ram operating means associated with said sleeve and controlled by a predetermined movement thereof relative to the ram.

10. Means for registering the punch and die of a dimpling machine with the selected hole of a workpiece, comprising a weighted sleeve mounted upon the reciprocating ram of the machine and carrying the punch thereof, said sleeve being movable independently of the ram, vacuum means associated with the ram for temporarily moving said sleeve with said ram on the return stroke of the latter, said ram and sleeve being formed with a vacuum relief opening so located as to be closed by said sleeve when in its operating position.

11. Means for registering the punch and die of a dimpling machine with the selected hole of the workpiece, comprising a weighted sleeve mounted upon the reciprocating ram of the machine and carrying the punch thereof, said sleeve being movable independently of the ram, coupling means engaging said ram and sleeve at the end of the power stroke of the former for raising the latter with the ram on the return stroke thereof.

12. A dimpling machine for indenting perforated sheet metal, comprising a cooperating punch and die shaped to indent the workpiece around a selected hole therein, means for operating said punch and die toward and away from each other, said punch being extensibly mounted to permit movement of the same toward the workpiece independently of the operating means, means associated with said operating means for moving said punch when said last mentioned means is operated on its return stroke, and means connected with said operating means and actuated by the relative movement of said punch for causing the ram to operate on its power stroke subsequently to registration of the workpiece.

13. A dimpling machine for indenting perforated sheet metal, comprising a cooperating punch and die shaped to indent the workpiece around a selected hole therein, means for operating said punch and die toward and away from each other, said punch being extensibly mounted to permit movement of the same toward the workpiece independently of the operating means, and circuit closing means associated with said punch for actuating said operating means subsequently to a predetermined movement of said punch toward the workpiece.

14. A dimpling machine for indenting perforated sheet metal, comprising a cooperating punch and die shaped to indent the workpiece around a selected hole therein, means for operating said punch and die toward and away from each other, said punch being extensibly mounted to permit movement of the same toward the workpiece independently of the operating means, circuit closing means associated with said punch for actuating said operating means subsequently to a predetermined movement of said punch toward the workpiece, and means for maintaining said circuit closing means operative until said operating means has subsequently completed its return stroke.

15. The combination with a dimpling machine having a coacting punch and die, and an operating ram, of means for registering the punch with the selected hole of a workpiece, comprising an extensible member carried by said ram and interposed between the latter and the punch, coupling means carried by said ram and said extensible member for connecting said member and said ram on the return stroke of the latter, and release means operable at the end of said return stroke for permitting said extensible member to move toward the workpiece independently of said ram.

16. The combination with a dimpling machine having a coacting punch and die, and an operating ram, of means for registering the punch with the selected hole of a workpiece, comprising an extensible member carried by said ram and interposed between the latter and the punch, coupling means carried by said ram and said extensible member for connecting said member and said ram, said coupling means causing said member to be moved with the ram during the return stroke thereof, and means operable to render said coupling means inoperative for permitting downward movement of said member independently of said ram.

17. The combination with a dimpling machine having a coacting punch and die, and an operating ram, of means for registering the punch with the selected hole of a workpiece, comprising and extensible member carried by said ram and interposed between the latter and the punch, coupling means carried by said ram and said extensible member for connecting said member and said ram, said coupling means causing said member to be moved with the ram during the return stroke thereof, and pilot means associated with said punch and engageable with the workpiece to prevent the actuation of said operating means in the absence of registration of said punch with a hole of the workpiece.

18. The combination with a dimpling machine having a coacting punch and a die, and an operating ram, of means for registering the punch with the selected hole of a workpiece, including a gravity actuated extensible member associated with the ram of the machine, said members carrying the punch and being disposed between the ram and the punch, said extensible member being movable toward the workpiece prior to and independently of the ram, and means associated with said ram and operable upon its upward stroke to momentarily raise said gravity means.

19. Means for registering the punch and die of a dimpling machine with the selected hole of a workpiece, comprising a reciprocating ram, punch-supporting means adapted for being actuated by said ram, means for mounting said supporting means whereby it is movable toward the workpiece independently of the ram for permitting the registration of the punch with the hole of the workpiece before the ram is operated, means for operating the ram, an electric switch cooperating with said supporting member and actuated thereby when the latter is in its extended position, and means associated with said switch to cause the operating means to be actuated.

20. Means for registering the punch and die of a dimpling machine with the selected hole of a workpiece, comprising a reciprocating ram, punch-supporting means adapted for being actuated by said ram, means for mounting said supporting means whereby it is movable toward the workpiece independently of the ram for permitting the registration of the punch with the hole of the workpiece before the ram is operated, means for operating the ram, an electric switch cooperating with said supporting member and actuated thereby when the latter is in its extended position, means associated with said switch to cause the operating means to be actuated, and means for maintaining said switch in its closed position until said ram has been retracted.

21. A dimpling machine for indenting perforated sheet metal, comprising a pair of cooperating dies shaped to indent the workpiece around a selected hole therein, means for operating said dies toward and away from each other, one of said dies being movable independently of the operating means and relatively to the workpiece to register with a hole therein prior to the actuation of the operating means, and means actuated by the independent movement of said movable die for causing said die to be actuated on its power stroke.

22. A dimpling machine for indenting perforated sheet metal comprising a cooperating punch and die shaped to indent the workpiece around a selected hole therein, a reciprocating ram for operating said movable die, a supporting member associated with said ram and carrying the movable die, said ram being movable independently of said supporting member during a portion of its power stroke, and means associated with said ram for momentarily moving said supporting means with the ram on its return stroke.

23. A device for registering a tool with a portion of a workpiece, comprising reciprocating means for operating the tool on its working stroke, extensible means associated with said reciprocating means and carrying said tool, whereby said tool may be actuated to a position of registration independently of the reciprocating means and prior to its operation, and means associated with said reciprocating means and said extensible means for causing the actuation of said extensible means by said reciprocating means on its return stroke.

24. A device for registering a tool with a portion of a workpiece, comprising reciprocating means for operating the tool on its working stroke, extensible means associated with said reciprocating means and carrying said tool, whereby said tool may be actuated to a position of registration independently of the reciprocating means and prior to its operation, means associated with said reciprocating means and said extensible means for causing the actuation of said extensible means by said reciprocating means on its return stroke, and means cooperating with said extensible means on its downward stroke to cause the actuation of said reciprocating means.

25. The combination with a dimpling machine having a coacting punch and die, and an operating ram, of means for registering the punch with the selected hole of a workpiece comprising an extensible member telescopically carried by said ram and interposed between the ram and the punch, means actuated by pressure-differential and operable to couple the extensible member to the ram, and means operable to render the pressure-differential means inoperative to permit the extensible member being extended from the ram for preliminarily registering the punch with the selected hole of the workpiece.

26. A dimpling machine having a punch and a co-operating die for co-acting upon an interposed workpiece, a ram for the punch having a punch-operating stroke, a support for the punch mounted upon the ram and adapted to be contacted by the latter for actuating the punch, said support being extensible from and in advance of the ram, a pilot carried by the punch and extensible therewith from the ram to enable placement of the pilot in registration with a hole in the interposed workpiece, and means operable by the relative movement of said support and ram to impart a punch-operating stroke to the ram whereby to actuate the punch in co-operation with the die and as guided by the pilot to dimple the interposed workpiece.

27. The combination with a pair of relatively movable dies and power means for operating them, of an extensible member carrying one of said dies and adapted for being actuated by and movable with said operating means, said member being mounted between the last mentioned die and said operating means, whereby it is adapted to be initially moved toward the workpiece independently of the power operating means for positioning said last mentioned die prior to its power-actuated stroke, and means associated with said operating means to move said first mentioned die with the operating means upon the return stroke thereof.

THOMAS H. SPELLER.